United States Patent [19]
Ota

[11] Patent Number: 5,404,241
[45] Date of Patent: Apr. 4, 1995

[54] OPTICAL COMMUNICATION NETWORK

[75] Inventor: Takeshi Ota, Kanagawa, Japan

[73] Assignee: Fuji Xerox Co., Ltd., Tokyo, Japan

[21] Appl. No.: 946,192

[22] Filed: Sep. 17, 1992

[30] Foreign Application Priority Data

Sep. 18, 1991 [JP] Japan .................. 3-238328

[51] Int. Cl.⁶ .......................................... H04B 9/00
[52] U.S. Cl. .................. 359/173; 359/118;
   359/121; 359/135; 359/136; 359/137
[58] Field of Search .............. 359/173, 118, 121, 113,
   359/120, 123, 127, 135, 136, 137; 370/77, 85.1,
   85.2, 85.3, 85.9, 26, 30, 36

[56] References Cited

U.S. PATENT DOCUMENTS

| | | | |
|---|---|---|---|
| 4,107,518 | 8/1978 | McMahon | 359/178 |
| 4,417,334 | 11/1983 | Gunderson et al. | 370/85 |
| 4,551,829 | 11/1985 | Dragoo et al. | 370/3 |
| 4,584,678 | 4/1986 | Ozeki et al. | 359/121 |
| 4,641,371 | 2/1987 | Shutterly | 359/178 |
| 4,972,513 | 11/1990 | Mochizuki et al. | 359/114 |

OTHER PUBLICATIONS

"Fibernet: Multimode Optical Fibers for Local Computer Networks," E. G. Rawson et al., IEEE Transaction on Communications, vol. Com-26, No. 7, pp. 983-990, Jul. 1978.

Primary Examiner—Richard E. Chilcot, Jr.
Assistant Examiner—Richard A. Moller
Attorney, Agent, or Firm—Finnegan, Henderson, Farabow, Garrett & Dunner

[57] ABSTRACT

In an optical communication network is disclosed. In the, a pair of optical fibers are coupled to each of a plurality nodes. Each node has two signal routes each including a transmit path and receive path. The paired optical fibers are connected to both terminals of a star coupler. The network includes a first branching filter for supplying a signal from the transmit path of the first signal route to one (first optical fiber) of the paired optical fibers, and for supplying a signal from the first optical fiber to the receive path of the second signal route, and a second branching filter for supplying a signal from the transmit path of the second signal route to the other (second optical fiber) of the paired optical fibers, and for supplying a signal from the second optical fiber to the receive path of the first signal route.

5 Claims, 6 Drawing Sheets

OPTICAL COMMUNICATION NETWORK

BACKGROUND OF THE INVENTION

The present invention relates to an optical communication network such as an optical LAN (Local Area Network) using optical communication.

In the communication network, optical fibers led from terminal devices are coupled with one another through couplers. Terminal devices communicate with each other through the optical fibers and couplers.

Of various types of known couplers, a so-called star coupler has been incorporated into an optical LAN disclosed by E. G. Rawson in his paper "Fibernet: Multimode Optical Fibers for Local Computer Networks", IEEE Transactions on Communications, Vol., COM-26, No. 7, July 1978.

FIG. 8 is a diagram schematically showing an optical LAN using a star coupler. A signal from each node 51 is converted into a light signal by a light emitting element 52a, and is supplied through an input optical fiber 53a to a star coupler 54. The light signals transmitted are all mixed in the coupler 54, and then are distributed through output optical fibers 53b to light sensing elements 52b. By the light sensing elements, the light signals are converted again into electrical signals, which in turn are supplied to the respective nodes 51. The optical LAN thus arranged and operated has the function (broadcasting function) capable of transmitting a signal emitted from one node to all the nodes. Therefore, it can provide a communication network similar to the ordinary LAN using coaxial cables.

A so-called multi-channel LAN has been proposed, in which each node is connected by two or more communication lines. In Japanese Patent Unexamined Publication No. Hei. 3-270432 filed by the assignee of the present Patent Application, in order to transmit real-time communication signals including speech signals and image signals, two types of buses, which are selectably operated according to the type of data to be transmitted, are used; one is of the line competition type, such as CSMA/CD (carrier sense multiple access/collision detection) and the other is of the time division type, such as TDMA (time division multiple access).

One of the approaches to realize the multi-channel LAN in optical communication is as shown in FIG. 9. In the figure, a line-competition type bus (first channel) and a time-division type bus (second channel), which are led from a bus controller 55, are connected through two star couplers 56 and 57 to nodes 58.

As shown in FIG. 10 the first channel is provided with a light emitting element 59a for signal transmission and a light sensing element 60a for signal reception. The second channel likewise is provided with a light emitting element 59b for signal transmission and a light sensing element 60b for signal reception.

The number of required star couplers in the multi-channel LAN increases as the number of buses, or the channels increases. The LAN containing an increased number of channels is complicated in construction, and suffers from an increase of cost to construct the LAN.

SUMMARY OF THE INVENTION

The present invention has been made in view of the above circumstances and has an object to provide a multi-channel optical communication network which can be constructed with the lowest possible increase of the number of required star couplers.

To achieve the above object, the present invention provides an optical communication network comprising: a pair of optical fibers derived from each of a plurality nodes each having two two-way channels or signal routes each including a transmit path and receive path, the paired optical fibers being connected to both terminals of a star coupler; a first branching filter for supplying a signal from the transmit path of the first signal route to one (first optical fiber) of the paired optical fibers, and for supplying a signal from the first optical fiber to the receive path of the second signal route; and a second branching filter for supplying a signal from the transmit path of the second signal route to the other (second optical fiber) of the paired optical fibers, and for supplying a signal from the second optical fiber to the receive path of the first signal route.

In the optical communication network, a signal from the transmit path of the first signal route is connected to the first terminal of the star coupler, through the first optical coupler and the first optical fiber. An output signal from the second terminal of the star coupler is connected to the receive path of the second signal route, through the second optical fiber and the second optical coupler. With this arrangement, the signal can be simultaneously sent to all the nodes connected to the star coupler. In a signal transmission from the second signal route, as in the signal transmission from the first signal route, a signal is supplied to the receive path of the second signal route. In this case, the light signal passes through the star coupler in the direction opposite to that in the signal transmission from the first signal route. Thus, the direction of the light signal in the first signal route is opposite to that of the light signal in the second signal route when the light signal passes through the star coupler. Accordingly, the light signals of the two two-way signal routes can be independently transmitted using a single star coupler.

BRIEF DESCRIPTION OF THE DRAWINGS

The accompanying drawings, which are incorporated in and constitute a part of this specification illustrate, the embodiments of the invention and, together with the description, serve to explain the objects, advantages and principles of the invention. In the drawings.

DETAILED DESCRIPTION OF THE PREFERRED EMBODIMENT

Preferred embodiments will be described with reference to the accompanying drawings.

Figure 1:
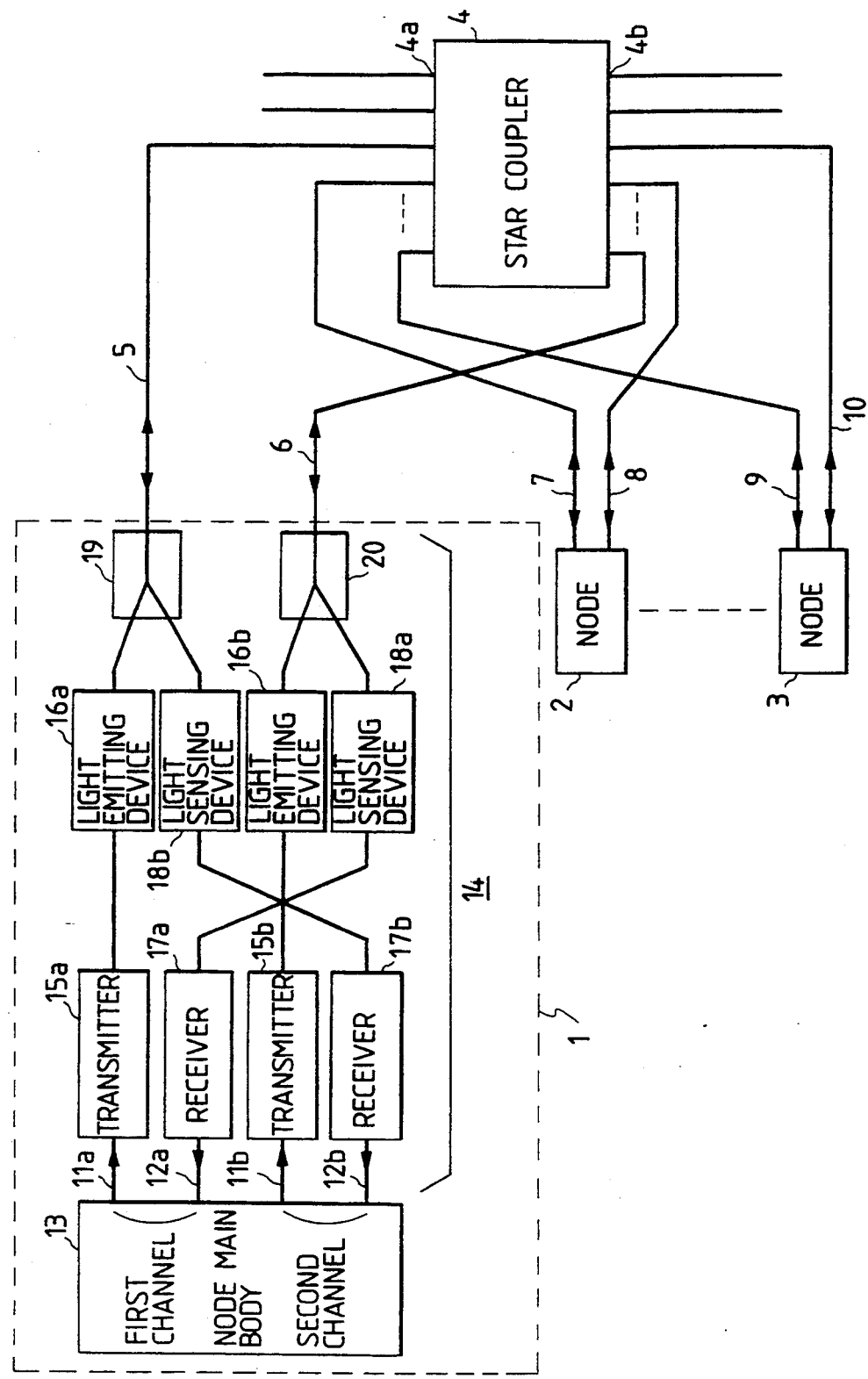
FIG. 1 is a block diagram showing an optical communication network according to an embodiment of the present invention.

FIG. 1 is a block diagram showing an optical communication network according to an embodiment of the present invention.

Figure 8:
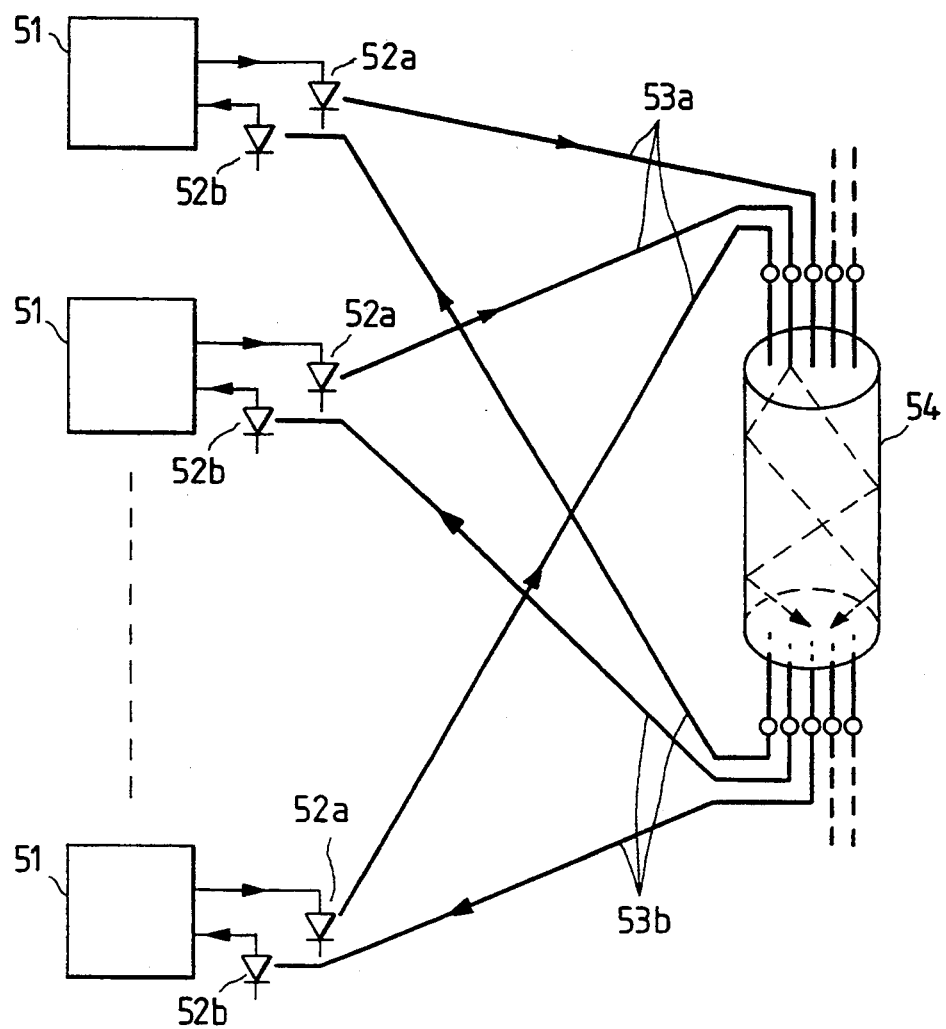
FIG. 8 is a diagram schematically showing a conventional optical LAN using star couplers.
Figure 9:
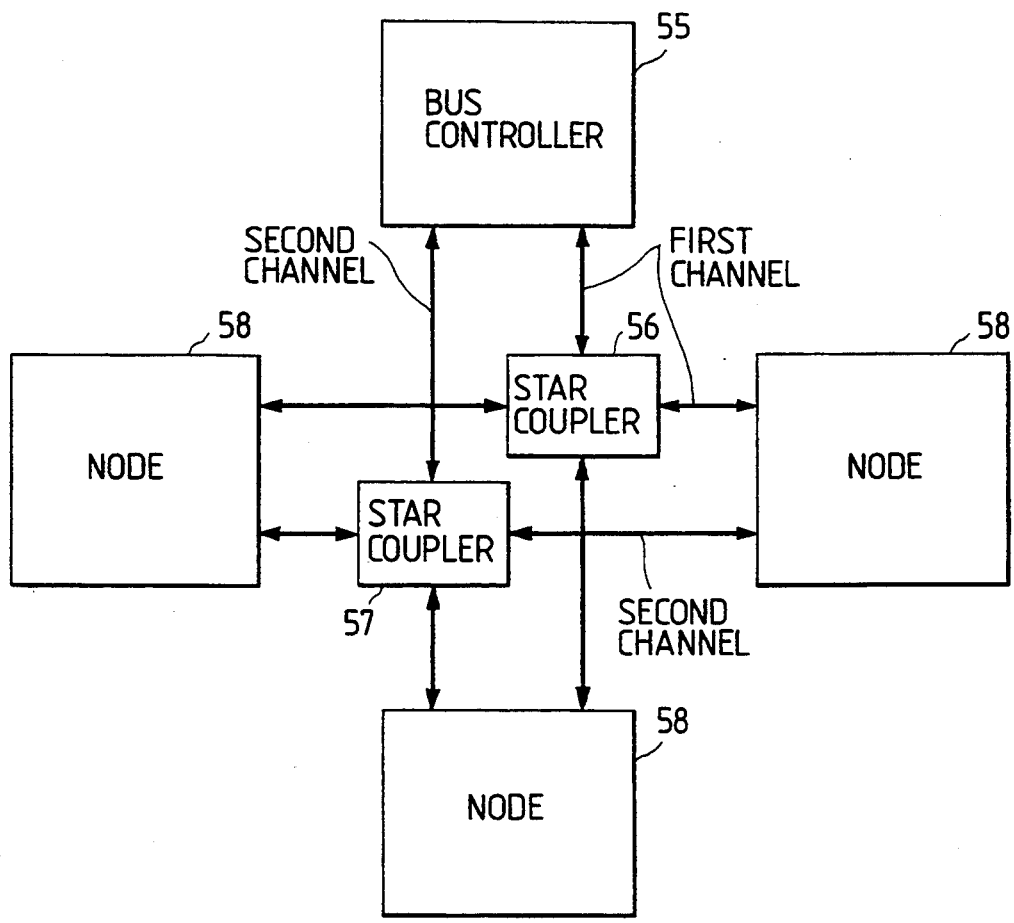
FIG. 9 is a block diagram schematically illustrating a conventional multi-channel optical LAN using star couplers.
Figure 10:
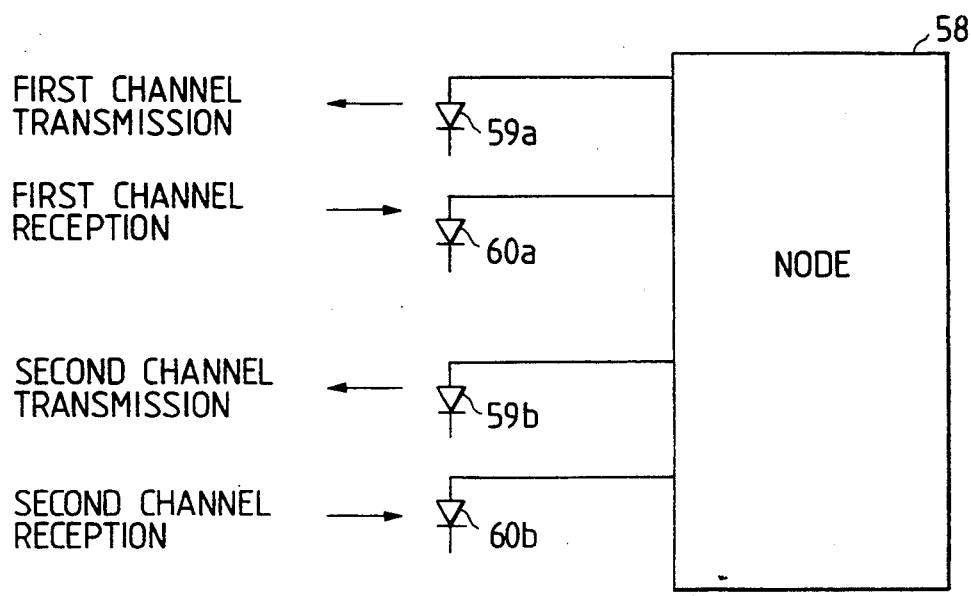
FIG. 10 is a diagram schematically illustrating the transmitting and receiving portions of the first and second channels in the conventional multi-channel LAN.

As shown, a plurality of nodes 1 to 3 are interconnected through a star coupler 4. This star coupler, similar in construction to that of the prior communication network already described referring to FIG. 8, is of the general passive type. For the detailed structure of the star coupler, reference is made to the Rawson's paper already referred to.

Pairs of fibers 5 and 6, 7 and 8, and 9 and 10 are derived from the nodes 1, 2 and 3, respectively. The fibers 5, 7, and 9 of those pairs of fibers are connected together to first coupling terminals 4a. The fibers 6, 8 and 10 of those pairs are connected to second coupling terminals 4b.

The node structure will be described bellow. For the description, the node 1 will typically be given since the nodes 1 to 3 have the same structure.

The node 1 includes a node main body 13 and a bidirectional interface 14 (referred simply to an interface). The host 13 has an output signal path 11a and an input signal path 12a for a first channel, and an output signal path 11b and an input signal path 12b for a second channel. The interface 14 servers as an interface between the main node body 13 and the star coupler 4.

In the interface 14, the output signal path 11a of the node main body 13 for the first channel is followed by a transmitter 15a and a light emitting device 16a. The input signal path 12a for the first channel is preceded by a receiver 17a and a light Sensing device 18a. The output signal path 11b for the second channel is followed by a transmitter 15b and a light emitting device 16b. The input signal path 12b for the second channel is preceded by a receiver 17b and a light sensing device 18b.

The output of the light emitting device 16a for the first channel and the input of the light sensing device 18b for the second channel are coupled to the respective branched terminals of a first optical coupler 19, which is a branching filter. The common interface of the first optical coupler 19 is connected to any of the first coupling locations 4a of the star coupler 4. Similarly, the output of the light emitting device 16b for the second channel and the input of the light sensing device 18a for the first channel are coupled to the respective branched terminals of a second optical coupler 20, which is a branching filter. The common interface of the second optical coupler 20 is connected to any of the second coupling location of (fiber terminal) 4b of the star coupler 4.

The optical communication network thus arranged will be described.

The transmitting operation through the first channel from the node 1 will first be described. An output electrical signal from the output signal path 11a of the host 13 is supplied to the transmitter 15a. Upon receipt of the output signal, the light emitting device 16a emits a light signal, so that the electrical signal has been converted into a light signal. The light signal is supplied to one of the first coupling terminals 4a of the star coupler 4, through the first branching filter 19 and the optical fiber 5. Thus, the light signal output from the node 1 appears at one of the second coupling terminal 4b of the star coupler 4. The light signal received is distributed from the star coupler 4 to the nodes 1 to 3, through optical fibers 6, 8, and 10.

In the receiving operation in the node 1, a light signal from the optical fiber 6 is branched into the route of the light sensing device 18a and the receiver 17a, by the second optical coupler 20. In the route, the light signal is converted into an electrical signal. The electrical signal is supplied through the input signal path 12a to the input terminal of the first channel of the node main body 13. The signal is transmitted from the node 1 and is received by the same. Actually, the same signal is received also by the nodes 2 and 3. In other words, a signal of the first channel transmitted from a node is received as the first channel signal by all other nodes. Thus, the broadcasting function is secured in the optical communication network.

The transmitting operation through the second channel from the node 1 will be described. In the operation mode, the transmitter 15b and the light emitting device 16b operate. A light signal emitted from the light emitting device 16b is supplied to one of the second first coupling terminals 4b of the star coupler 4 through the second optical coupler branching filter 20 and the optical fiber 6. The light signal derived from the first coupling terminals 4a of the star coupler 4 passes through the optical fiber 5, and is branched by the first optical coupler 19 into the route of the light sensing device 18b and the receiver 17b. In the route, the light signal is converted into an electrical signal. The electrical signal is supplied through the input signal path 12b to the input terminal of the second channel of the host 13.

As described above, in the first channel transmission from the node 1, the optical fiber 5 serves as a transmission line, and the optical fiber 6, as a reception line. In the second channel transmission from the node 1, the optical fiber serves as a transmission line, and the optical fiber 5, as a reception line.

The star coupler 4 is capable of separating the first channel light signal from the second channel light signal in a manner that in the first channel transmission, the light signal is input to the first coupling terminals 4a of the star coupler 4, and in the second channel transmission, it is input to the second coupling terminals 4b, in other words, by utilizing the optical bidirectionality of optical components, including at least star coupler 4 and the optical fibers 5-10.

Description to follow is the communication among the nodes using different protocols in the multi-channel optical communication network.

It is assumed now that the first channel operates according to the protocol of the line competition, and the second channel operates according to the protocol of the time-division, and that one of the nodes is operated as a bus controller called a slot generator and has the time-control function for the second channel.

Figure 2:
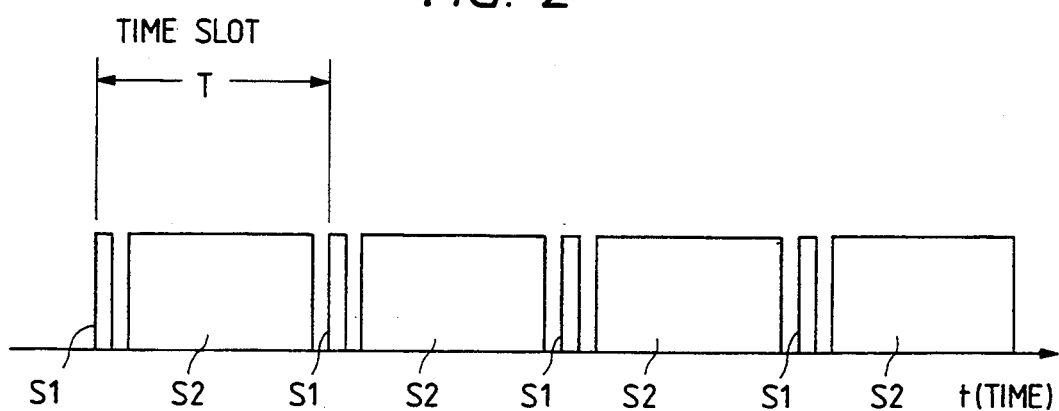
FIG. 2 is a diagram for explaining a time slot in a time-division type.

FIG. 2 is a diagram for explaining the bus controller function. The node functioning as a bus controller produces a bus control signal S1 and a node signal S2 for every time slot T, as shown in FIG. 2. The bus control signal S1 contains a message for designating a specific node. All the nodes in the network receive the bus control signal S1. Only the node or nodes designated by the message is permitted to transmit a signal within the time slot T. The signal generated by the node upon the permission is the node signal S2.

The procedure of starting a time-division communication will be described.

When a node desires to make a transmission by using the time-division bus, or the second channel, it sends a transmission request signal to the bus controller, through the competition bus, that is, the first channel. The bus controller, when received the request signal, generates a bus control signal S1 containing a message of permitting the requesting node to transmit, and sends it to the request generating node. Upon receipt of the permission signal, the request generating node transmits a node signal S2 for a given short period by using the second channel. Accordingly, speech signals and motion picture signals can be transmitted in real time.

In the above-mentioned embodiment, two communication channel are formed by a single star coupler. Two star couplers, if used, provide four communication channels, and three star couplers provide six communication channels. Thus, the number of the communication channels can be increased by two channels every time one star coupler is additionally used.

In the embodiment as mentioned above, the optical communication network is of the multi-channel type and two different protocols are used. It is evident to those skilled in the art that the present invention is applicable for any type of optical communication network which includes a plurality of communication channels.

A passive type star coupler as disclosed in Japanese Patent Unexamined Publication No. Hei. 3-296332, filed by the assignee of the present Patent Application is applicable for the optical communication network, instead of the general star coupler in the embodiment as mentioned above. The passive type star coupler (hereinafter referred to as an interconnectible star coupler) is designed such that a signal transfer coefficient between the input and output terminals paired to be coupled with the same node is zero (0).

Where the number of nodes used is increased, it is possible to expand the network by connecting the star couplers, if these are interconnectible star couplers. The network constructed by connecting the interconnectible star couplers is bidirectional as described in the above Japanese Patent Unexamined Publication No. Hei. 3-296332. The bidirectional nature may be utilized to keep the security of communication and increase the communication capacity.

An interconnectable star coupler of the passive type, which may be used in place of the star coupler 4 in the optical communication network of FIG. 1, will be described with reference to FIGS. 3 and 5.

Figure 3:
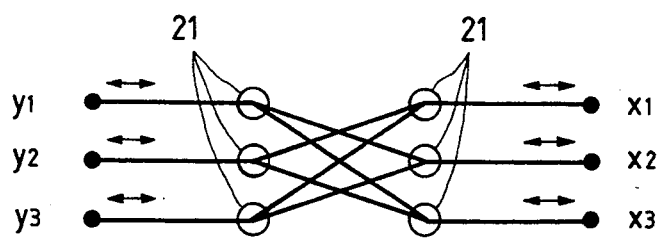
FIG. 3 is a diagram schematically showing the circuit arrangement of a 3-terminal interconnectible star coupler of the passive type, which is applicable for the optical communication network shown in FIG. 1.
Figure 4:
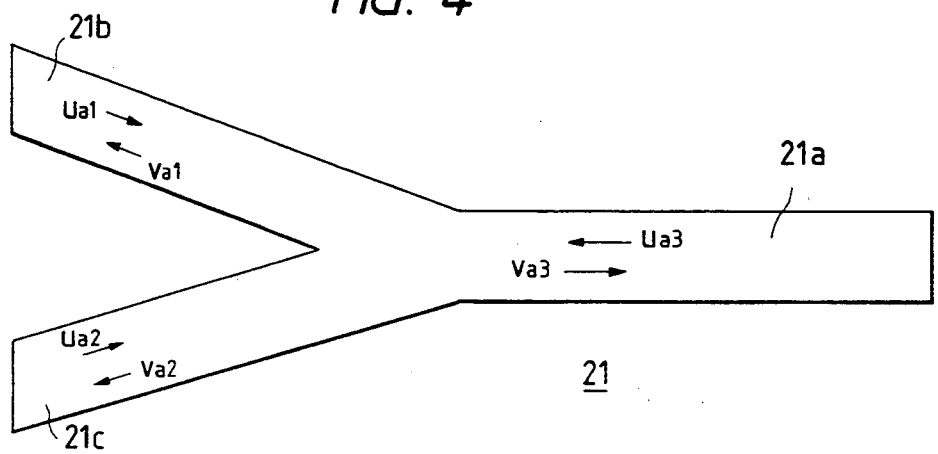
FIG. 4 is a diagram showing a 1×2 optical coupler used in the star coupler of FIG. 3.

FIG. 3 is a diagram schematically showing the circuit arrangement of a 3-terminal interconnectible star coupler of the passive type, which is applicable for the optical communication network shown in FIG. 1. In this instance, six units of the 1×2 optical coupler 21 make up an interconnectible star coupler of the passive type. As shown in FIG. 4, in the 1×2 optical coupler 21, an optical path 21a is bifurcated into two optical paths 21b and 21c. A transfer characteristic of the 1×2 optical coupler 21 is given by:

$$\begin{bmatrix} v_{a1} \\ v_{a2} \\ v_{a3} \end{bmatrix} = \begin{bmatrix} 0 & 0 & 1/2 \\ 0 & 0 & 1/2 \\ 1 & 1 & 0 \end{bmatrix} \begin{bmatrix} u_{a1} \\ u_{a2} \\ u_{a3} \end{bmatrix}$$

where $u_{a1}$, $u_{a2}$, $u_{a3}$, $v_{a1}$, $v_{a2}$, and $v_{a3}$ are input and output light signals to and from the respective terminals.

The star coupler has the following transfer characteristic:

$$\begin{bmatrix} y_1 \\ y_2 \\ y_3 \\ x_1 \\ x_2 \\ x_3 \end{bmatrix} = \begin{bmatrix} 0 & 1/2 & 1/2 & 0 & 0 & 0 \\ 1/2 & 0 & 1/2 & 0 & 0 & 0 \\ 1/2 & 1/2 & 0 & 0 & 0 & 0 \\ 0 & 0 & 0 & 0 & 1/2 & 1/2 \\ 0 & 0 & 0 & 1/2 & 0 & 1/2 \\ 0 & 0 & 0 & 1/2 & 1/2 & 0 \end{bmatrix} \begin{bmatrix} x_1 \\ x_2 \\ x_3 \\ y_1 \\ y_2 \\ y_3 \end{bmatrix} \quad (1)$$

Figure 5:
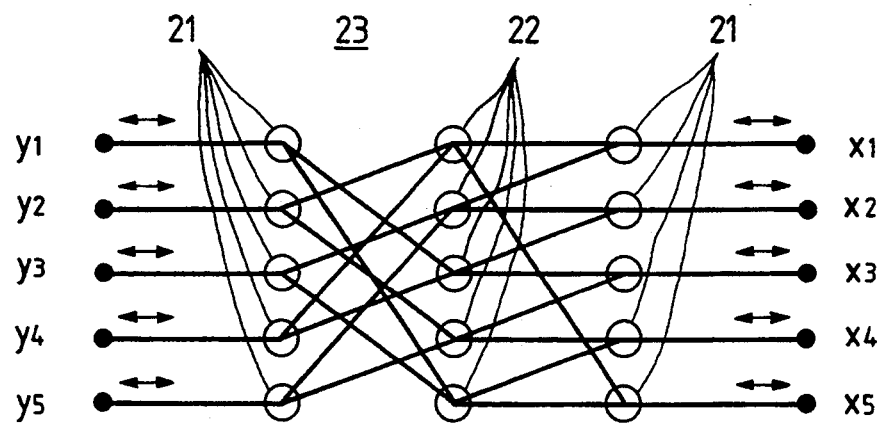
FIG. 5 is a diagram schematically showing the circuit arrangement of a 5-terminal interconnectible star coupler of the passive type, which is applicable for the optical communication network shown in FIG. 1.
Figure 6:
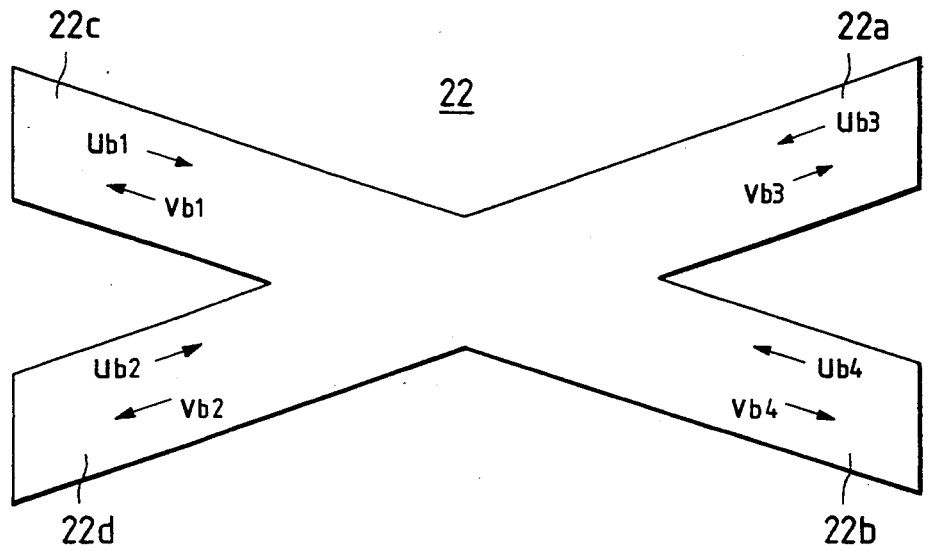
FIG. 6 is a diagram showing a 2×2 optical coupler used in the star coupler of FIG. 5.

FIG. 5 is a diagram schematically showing the circuit arrangement of a 5-terminal interconnectible star coupler of the passive type, which is applicable for the optical communication network shown in FIG. 1. In this instance, ten 1×2 optical couplers 21 and five 2×2 optical couplers 22 are combined. The 2×2 optical coupler 22 has a pair of optical paths 22a and 22b on one side and another pair of optical paths 22c and 22d on the other side, as shown in FIG. 6. The transfer characteristic of the 2×2 optical coupler 22 is given by:

$$\begin{bmatrix} v_{b1} \\ v_{b2} \\ v_{b3} \\ v_{b4} \end{bmatrix} = \begin{bmatrix} 0 & 0 & 1/2 & 1/2 \\ 0 & 0 & 1/2 & 1/2 \\ 1/2 & 1/2 & 0 & 0 \\ 1/2 & 1/2 & 0 & 0 \end{bmatrix} \begin{bmatrix} u_{b1} \\ u_{b2} \\ u_{b3} \\ u_{b4} \end{bmatrix}$$

where $u_{b1}$, $u_{b2}$, $u_{b3}$, $u_{b4}$, $v_{b1}$, $v_{b2}$, $v_{b3}$, and $v_{b4}$ are input and output light signals to the respective terminals.

The transfer characteristic of the star coupler 23 is given by the following equation:

$$\begin{bmatrix} y_1 \\ y_2 \\ y_3 \\ y_4 \\ y_5 \\ x_1 \\ x_2 \\ x_3 \\ x_4 \\ x_5 \end{bmatrix} = \begin{bmatrix} 0 & 1/4 & 1/4 & 1/4 & 1/4 & 0 & 0 & 0 & 0 & 0 \\ 1/4 & 0 & 1/4 & 1/4 & 1/4 & 0 & 0 & 0 & 0 & 0 \\ 1/4 & 1/4 & 0 & 1/4 & 1/4 & 0 & 0 & 0 & 0 & 0 \\ 1/4 & 1/4 & 1/4 & 0 & 1/4 & 0 & 0 & 0 & 0 & 0 \\ 1/4 & 1/4 & 1/4 & 1/4 & 0 & 0 & 0 & 0 & 0 & 0 \\ 0 & 0 & 0 & 0 & 0 & 0 & 1/4 & 1/4 & 1/4 & 1/4 \\ 0 & 0 & 0 & 0 & 0 & 1/4 & 0 & 1/4 & 1/4 & 1/4 \\ 0 & 0 & 0 & 0 & 0 & 1/4 & 1/4 & 0 & 1/4 & 1/4 \\ 0 & 0 & 0 & 0 & 0 & 1/4 & 1/4 & 1/4 & 0 & 1/4 \\ 0 & 0 & 0 & 0 & 0 & 1/4 & 1/4 & 1/4 & 1/4 & 0 \end{bmatrix} \begin{bmatrix} x_1 \\ x_2 \\ x_3 \\ x_4 \\ x_5 \\ y_1 \\ y_2 \\ y_3 \\ y_4 \\ y_5 \end{bmatrix} \quad (2)$$

Figure 7:
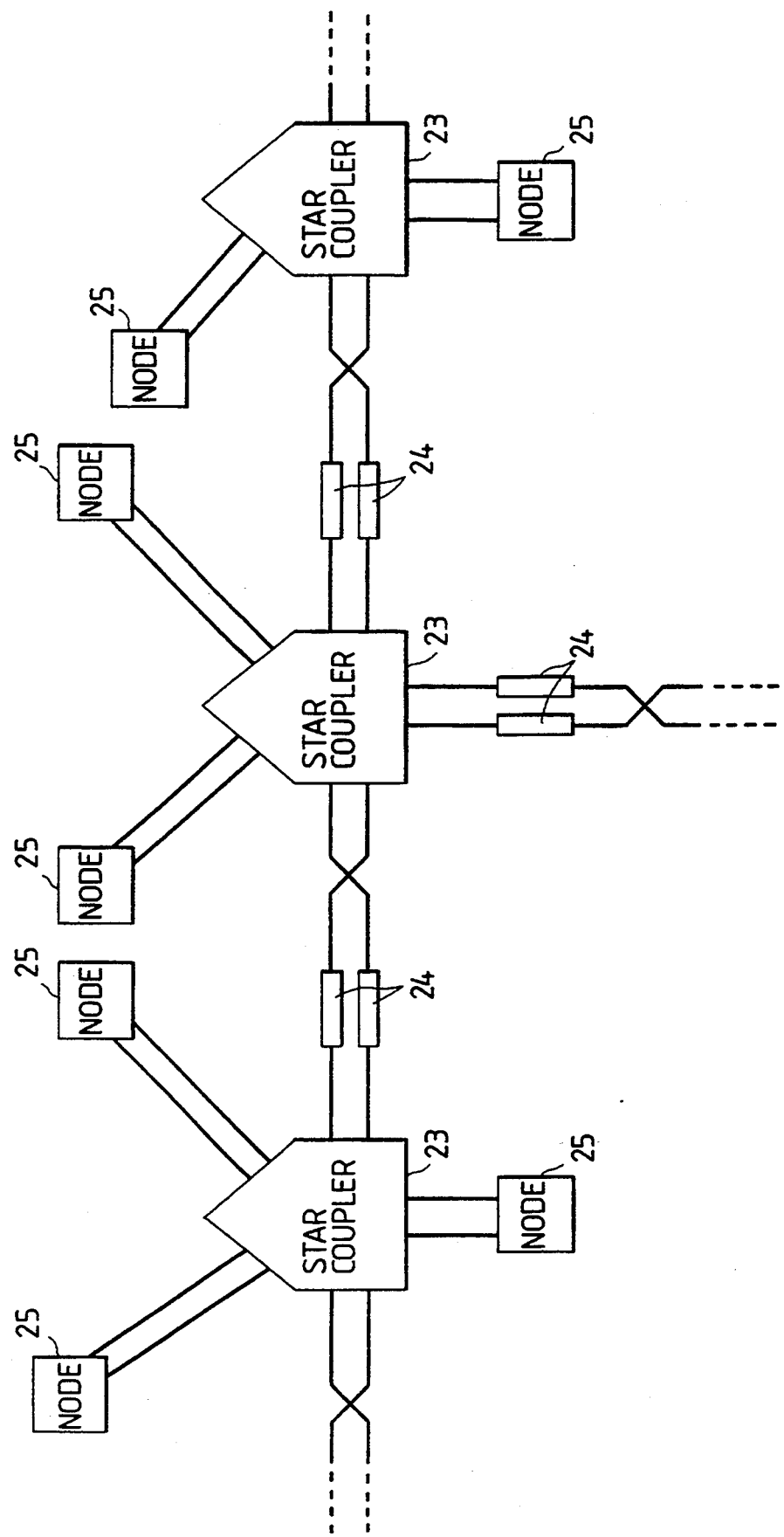
FIG. 7 shows in block form the construction of an optical communication network including 5-terminal interconnectible star couplers of the passive type and bidirectional optical amplifiers.

FIG. 7 shows an example of construction of optical communication network formed of combination of the 5-terminal interconnectible passive star couplers of FIG. 5 and bidirectional optical amplifiers.

In the figure, reference numeral 23 designates a 5-terminal interconnectable star coupler as shown in FIG. 5; 24, a bidirectional optical amplifier; and 25, a node with the interface 14 shown in FIG. 1. In this instance, the bidirectional optical amplifier 24 is a semiconductor laser amplifier, but may be a rare-earth doped fiber amplifier, if required. For the details of the semiconductor laser amplifier, reference is made to a paper by Shimada and Nakagawa, entitled "Present State of Semiconductor Laser Amplifiers in an Optical Communication Network", O plus E, August 1989, pp106 to 111. For the rare-earth doped fiber amplifier, reference is made to a paper by Horiguchi entitled "Optical Fiber Amplifiers", Optics, Vol. 19, No. 5, pp276 to 282.

The optical communication network constructed as shown in FIG. 7 has at least two advantageous features. That is, two independent, bidirectional communication channels can be formed using one star coupler. Further, when the network must be expanded, it can be realized by using additionally an interconnectable star coupler or couplers of the passive type correspondingly to increase of the number of nodes.

As seen from the foregoing description, two independent communication channels can be formed using one star coupler. A multi-channel optical communication network can be constructed with the lowest possible increase of the number of required star couplers. The construction of the resultant optical communication network is simple. Further, cost to construct the optical communication network is reduced.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An optical communication network comprising:
   a star coupler;
   a plurality of nodes, each node of said plurality of nodes having a first two-way channel for first signal communication and a second two-way channel for second signal communication, said first channel including a first transmission path and a first receive path both for said first signal communication, and said second channel including a second transmission path and a second receive path both for said second signal communication; and
   a pair of optical fibers for each said node, said pair of fibers coupled to said node, respective fibers of said pair of optical fibers being connected to different terminals of said star coupler;
   wherein each of said plurality of nodes comprises:
   a first optical coupler for supplying a signal of said first signal communication from said first transmission path of said first channel to a first optical fiber of said pair of optical fibers, and for supplying a signal of said second signal communication from said first optical fiber to said second receive path of said second channel; and
   a second optical coupler for supplying a signal of said second signal communication from said second transmission path of said second channel to a second optical fiber of said pair of optical fibers, and for supplying a signal of said first signal communication from said second optical fiber to said first receive path of said first channel.

2. An optical communication network as claimed in claim 1, wherein said star coupler is an interconnectable star coupler in which a signal transfer coefficient between an input terminal and an output terminal paired to be coupled with the same node is zero.

3. An optical communication network having a plurality of sub-networks, each two sub-networks of said plurality of sub-networks having an interconnection, wherein each of said sub-networks comprises:
   a star coupler;
   a plurality of nodes, each node of said plurality of nodes having a first two-way channel for first signal communication and a second two-way channel for second signal communication, said first channel including a first transmission path and a first receive path both for said first signal communication, and said second channel including a second transmission path and a second receive path both for said second signal communication; and
   a pair of optical fibers for each said node, said node, respective fibers of said pair of optical fibers being connected to different terminals of said star coupler;
   wherein each of said plurality of nodes comprises:
   a first optical coupler for supplying a signal of said first signal communication from said first transmission path of said first channel to a first optical fiber of said pair of optical fibers, and for supplying a signal of said second signal communication from said first optical fiber to said second receive path of said second channel; and
   a second optical coupler for supplying a signal of said second signal communication from said second transmission path of said second channel to a second optical fiber of said pair of optical fibers, and for supplying a signal of said first signal communication from said second optical fiber to said first receive path of said first channel, and further wherein the interconnection between the two sub-networks comprises a pair of optical fibers and a pair optical amplifiers, each optical amplifier connected to amplify signals in a respective one of the pair of optical fibers.

4. An optical communication network as defined in claim 3 wherein each said optical amplifier is a bidirectional optical amplifier.

5. An optical communication network as claimed in claim 2, wherein:
   the interconnectable start coupler has said transfer coefficient and comprises:
   A. first and second terminal sets each comprising $(2n+1)$ terminals wherein n is integer of at least two;
   B. $(2n+1)$ optical couplers that are $1 \times 2$ optical couplers each having a source path and two bifurcated paths, each of said terminals being a source optical path of a corresponding $1 \times 2$ optical coupler;
   C. $(n-1)$ sets of optical means comprising $(2n+1)$ $2 \times 2$ optical couplers, each having 2 first-side bifurcated paths and 2 second side bifurcated paths; and
   D. optical connections connecting each bifurcated path of a $1 \times 2$ optical coupler to a respective bifurcated path of a $2 \times 2$ optical coupler, respective bifurcated paths of $2 \times 2$ optical couplers being connected to omit connection from each node back to the same node.

* * * * *

UNITED STATES PATENT AND TRADEMARK OFFICE
CERTIFICATE OF CORRECTION

PATENT NO. : 5,404,241
DATED : Apr. 4, 1995
INVENTOR(S) : Takeshi OTA

It is certified that error appears in the above-indentified patent and that said Letters Patent is hereby corrected as shown below:

Abstract, item [57], Line 1 "In an" should read --An--.

Abstract, Front Page, Line 2 after "the" insert --network--.

Abstract, item [57], Line 3 before "nodes" insert --of--.

Claim 3, Column 8, Line 41 after "pair" insert --of--.

Claim 5, Column 8, Line 61 "second side" should read --second-side--.

Signed and Sealed this

Tenth Day of October, 1995

Attest:

BRUCE LEHMAN

*Attesting Officer*    *Commissioner of Patents and Trademarks*